US008478668B2

(12) United States Patent
Woodward et al.

(10) Patent No.: US 8,478,668 B2
(45) Date of Patent: Jul. 2, 2013

(54) HIERARCHICAL ENTITLEMENT SYSTEM WITH INTEGRATED INHERITANCE AND LIMIT CHECKS

(75) Inventors: Bruce G. Woodward, Orem, UT (US); Debra Smith, Waterloo (CA); Richard Pledereder, Pleasanton, CA (US)

(73) Assignee: Sybase, Inc., Dublin, CA (US)

( * ) Notice: Subject to any disclaimer, the term of this patent is extended or adjusted under 35 U.S.C. 154(b) by 2017 days.

(21) Appl. No.: 10/708,920

(22) Filed: Mar. 31, 2004

(65) Prior Publication Data

US 2005/0203836 A1 Sep. 15, 2005

Related U.S. Application Data

(60) Provisional application No. 60/521,221, filed on Mar. 12, 2004.

(51) Int. Cl.
*G06Q 40/00* (2012.01)

(52) U.S. Cl.
USPC .......................................................... 705/35

(58) Field of Classification Search
USPC .................................................... 705/35–45
See application file for complete search history.

(56) References Cited

U.S. PATENT DOCUMENTS

| | | | |
|---|---|---|---|
| 5,297,026 A | 3/1994 | Hoffman | 704/14 |
| 5,742,759 A | 4/1998 | Nessett et al. | 713/201 |
| 5,748,890 A | 5/1998 | Goldberg et al. | 713/202 |
| 5,911,143 A | 6/1999 | Deinhart et al. | 707/103 |
| 5,930,764 A | 7/1999 | Melchione et al. | 705/10 |
| 6,012,049 A | 1/2000 | Kawan | 705/41 |
| 6,014,666 A | 1/2000 | Helland et al. | 707/9 |
| 6,023,765 A | 2/2000 | Kuhn | 713/200 |
| 6,041,314 A | 3/2000 | Davis | 705/41 |
| 6,055,637 A | 4/2000 | Hudson et al. | 713/201 |
| 6,064,988 A | 5/2000 | Thomas | 705/44 |
| 6,085,191 A | 7/2000 | Fisher et al. | 707/9 |
| 6,088,679 A | 7/2000 | Barkley | 705/8 |
| 6,092,203 A | 7/2000 | Ooki et al. | 713/201 |
| 6,154,843 A | 11/2000 | Hart et al. | 713/201 |
| 6,161,139 A * | 12/2000 | Win et al. | 709/225 |

(Continued)

OTHER PUBLICATIONS

Sun Microsystems, Java 2 Platform Enterprise Edition Specification, v. 1.4, Final Release, Sun Microsystems, Inc., Mountain View, CA, Nov. 24, 2003.

(Continued)

*Primary Examiner* — Daniel Felten
*Assistant Examiner* — Clifford Madamba
(74) *Attorney, Agent, or Firm* — Sterne, Kessler, Goldstein and Fox, P.L.L.C.

(57) ABSTRACT

A hierarchical entitlement system with integrated inheritance and limit checks is described. In one embodiment, for example, a computer-implemented method is described for specifying and enforcing entitlements for performance of financial transactions, the method comprises steps of: providing a hierarchical entitlement structure with inheritance for specifying entitlements for performing financial transactions; receiving user input for defining a plurality of entitlement groups of the hierarchical entitlement structure, wherein each entitlement group has specified permissions to perform financial transactions, limits on performance of the financial transactions, and membership of each user; in response to a particular user request to perform a financial transaction at runtime, identifying the particular user's membership in a certain entitlement group; and determining whether to allow the particular user to perform the financial transaction based on permissions and limits of the hierarchical entitlement structure applicable to the particular user's performance of the financial transaction.

39 Claims, 6 Drawing Sheets

U.S. PATENT DOCUMENTS

| | | | | |
|---|---|---|---|---|
| 6,167,441 | A | 12/2000 | Himmel | 709/217 |
| 6,182,142 | B1 | 1/2001 | Win et al. | 709/229 |
| 6,192,405 | B1 | 2/2001 | Bunnell | 709/225 |
| 6,202,066 | B1 * | 3/2001 | Barkley et al. | 707/785 |
| 6,205,447 | B1 | 3/2001 | Malloy | 707/102 |
| 6,237,036 | B1 | 5/2001 | Ueno et al. | 709/225 |
| 6,289,324 | B1 | 9/2001 | Kawan | 705/41 |
| 6,317,750 | B1 | 11/2001 | Tortolani et al. | 707/103 |
| 6,385,604 | B1 | 5/2002 | Bakalash et al. | 707/3 |
| 6,405,207 | B1 | 6/2002 | Petculescu et al. | 707/102 |
| 6,453,353 | B1 | 9/2002 | Win et al. | 709/229 |
| 6,466,932 | B1 | 10/2002 | Dennis et al. | 707/3 |
| 6,513,019 | B2 | 1/2003 | Lewis | 705/35 |
| 6,581,068 | B1 | 6/2003 | Bensoussan et al. | 707/104.1 |
| 6,604,113 | B1 | 8/2003 | Kenyon et al. | 707/104.1 |
| 6,829,333 | B1 | 12/2004 | Frazier | 379/88.17 |
| 6,836,776 | B2 | 12/2004 | Schreiber | 707/100 |
| 6,850,893 | B2 | 2/2005 | Lipkin et al. | 705/8 |
| 6,856,970 | B1 | 2/2005 | Campbell et al. | 705/35 |
| 6,859,212 | B2 | 2/2005 | Kumar et al. | 345/744 |
| 2001/0056398 | A1 | 12/2001 | Scheirer | |
| 2002/0029339 | A1 * | 3/2002 | Rowe | 713/182 |
| 2003/0105707 | A1 | 6/2003 | Audebert et al. | |
| 2006/0041498 | A1 | 2/2006 | Hausman et al. | |

OTHER PUBLICATIONS

Sun Microsystems, JavaServer Pages(TM) Specification 2.0 Final Release (Overview); Sun Microsystems, Inc., Mountain View, CA, Nov. 24, 2003.

Sun Microsystems, Inc., JDBC 3.0 Specification (Ch. 1-5), Final Release, Sun Microsystems, Inc., Mountain View, CA, Oct. 2001.

W3C, HTML 4.01 Specification (Ch. 1-7), W3C, Dec. 24, 1999.

W3.ORG, Extensible Markup Language (XML) 1.0 specification, Oct. 6, 2000.

Attribute Certification: An Enabling Technology for Delegation and Role-Based Controls in Distributed Environments, Proceedings of Fourth ACM on Role-Based Access Controls, pp. 121-130, 1999.

* cited by examiner

HIERARCHICAL ENTITLEMENT SYSTEM WITH INTEGRATED INHERITANCE AND LIMIT CHECKS

CROSS REFERENCE TO RELATED APPLICATIONS

The present application is related to and claims the benefit of priority of the following commonly-owned, presently-pending provisional application(s): application Ser. No. 60/521,221, filed Mar. 12, 2004, entitled "Hierarchical Entitlement System with Integrated Inheritance and Limit Checks", of which the present application is a non-provisional application thereof. The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, created: Mar. 12, 2004, 12:44 pm, size: 57.7 KB; Object ID: File No. 1; Object Contents: Source Code.

BACKGROUND OF INVENTION

1. Field of the Invention

The present invention relates generally to data processing environments and, more particularly, to a hierarchical permission system providing methodology for cumulative limit checks for financial services entitlements systems.

2. Description of the Background Art

In the area of financial services, there is a common need for authorizing individuals having particular roles in an organization to perform a number of different functions or operations. The process of defining roles includes: (1) representing the hierarchy of an organization, and (2) associating that hierarchy with specific employees and employee types. What is special about financial services is that these roles are not only attached to specific functions (i.e., specific operations, such as being able to initiate a wire transfer or an automated clearing house (ACH) transaction), but also with a function on a particular object, such as being able to perform a wire transaction on a specific account. Also important in the area of financial services is the notion of controlling access to objects regardless of function. Therefore, in addition to a role-based hierarchy for business users and business employees, there is a need for provisioning both functions and objects. Particularly important is the notion of overlaying both of those mechanisms with limit checks.

Limit checks may be explained as follows. Once employees are provisioned for certain functions and objects, a business typically wants employees of a particular position to perform certain operations on behalf of the business. Accordingly, the business at that point will authorize employees of a given position or role to perform the operations, but will also establish limits (i.e., limitations) on performing the operations. Typically, the business will define that an employee of a given position or role is allowed to perform operations up to a particular limit (e.g., a dollar amount). For example, a given user may be authorized to sign checks, but only up to a certain amount (e.g., less than or equal to $1000). The limit checks themselves may be defined as a static per-transaction limit, a cumulative limit over a period of time and/or a combined cumulative per-transaction and per-object limit over a period of time.

Given this backdrop, businesses need to be able to successfully represent and manage a hierarchy to perform functions and to grant permission for functions, as well as object-based permissions thereof, and businesses need to be able to attach limits to these functions and limits to these objects. Additionally, businesses need to be able to specify whether a given limit is a transaction-based limit or an object-related limit. For instance, a business might need to specify: "Employee A is authorized to perform wire transactions up to $1,000." However, the business might also need the ability to specify that Employee A is authorized to perform wire transactions of up to $1,000 on a certain account. The specification of authority granted to particular employees or groups may grow more complex in order to meet the needs of a business. For example, the business might also need the ability to specify that Employee A is authorized to perform wire transactions on a certain account subject to the following limits: up to $1,000 of wires per day, up to $10,000 of wires per month, and up to $30,000 of wires per quarter. In addition to basic limit checks in the foregoing example, the business may also need to establish cumulative limit tracking for groups of employees, including tracking on a per period basis. Periods are typically daily, weekly, monthly, quarterly, annually, or the like. For example, all members of a given account payable group may only be authorized for a total of up to $10,000 of wires per week.

Today, there are a number of hierarchical role based systems that exist, in the context of database systems and in the context of permission-based systems. None of those available systems, however, have an effective, flexible, highly efficient mechanism to maintain control of hierarchical limit checks for both functions and objects. Therefore, although database and permission-based systems are available to define hierarchical roles, none of them have the ability to flexibly and efficiently implement limit checks.

All told, there are a wide range of financial activities that may be performed through the hierarchy of roles that a business may establish. What is needed is a solution that allows businesses to authorize activities through a hierarchy of roles while also establishing and enforcing limits among multiple dimensions, thereby allowing constraint processing in a manner that achieves the business goals desired. The solution should allow multiple dimensions to be processed in different combinations along the lines of users and their groups, along the lines of hierarchical groups, along the lines of time periods, and along the lines of objects and functions (including monetary limits). The present invention provides a solution for these and other needs.

SUMMARY OF INVENTION

A hierarchical entitlement system with integrated inheritance and limit checks is described. In one embodiment, for example, a computer-implemented method of the present invention is described for specifying and enforcing entitlements for performance of financial transactions, the method comprises steps of: providing a hierarchical entitlement structure with inheritance for specifying entitlements for performing financial transactions; receiving user input for defining a plurality of entitlement groups of the hierarchical entitlement structure, wherein each entitlement group has specified permissions to perform financial transactions, limits on performance of the financial transactions, and membership of each user; in response to a particular user request to perform a financial transaction at runtime, identifying the particular user's membership in a certain entitlement group; and determining whether to allow the particular user to perform the financial transaction based on permissions and limits of the hierarchical entitlement structure applicable to the particular user's performance of the financial transaction.

DETAILED DESCRIPTION

Glossary

Figure 1:
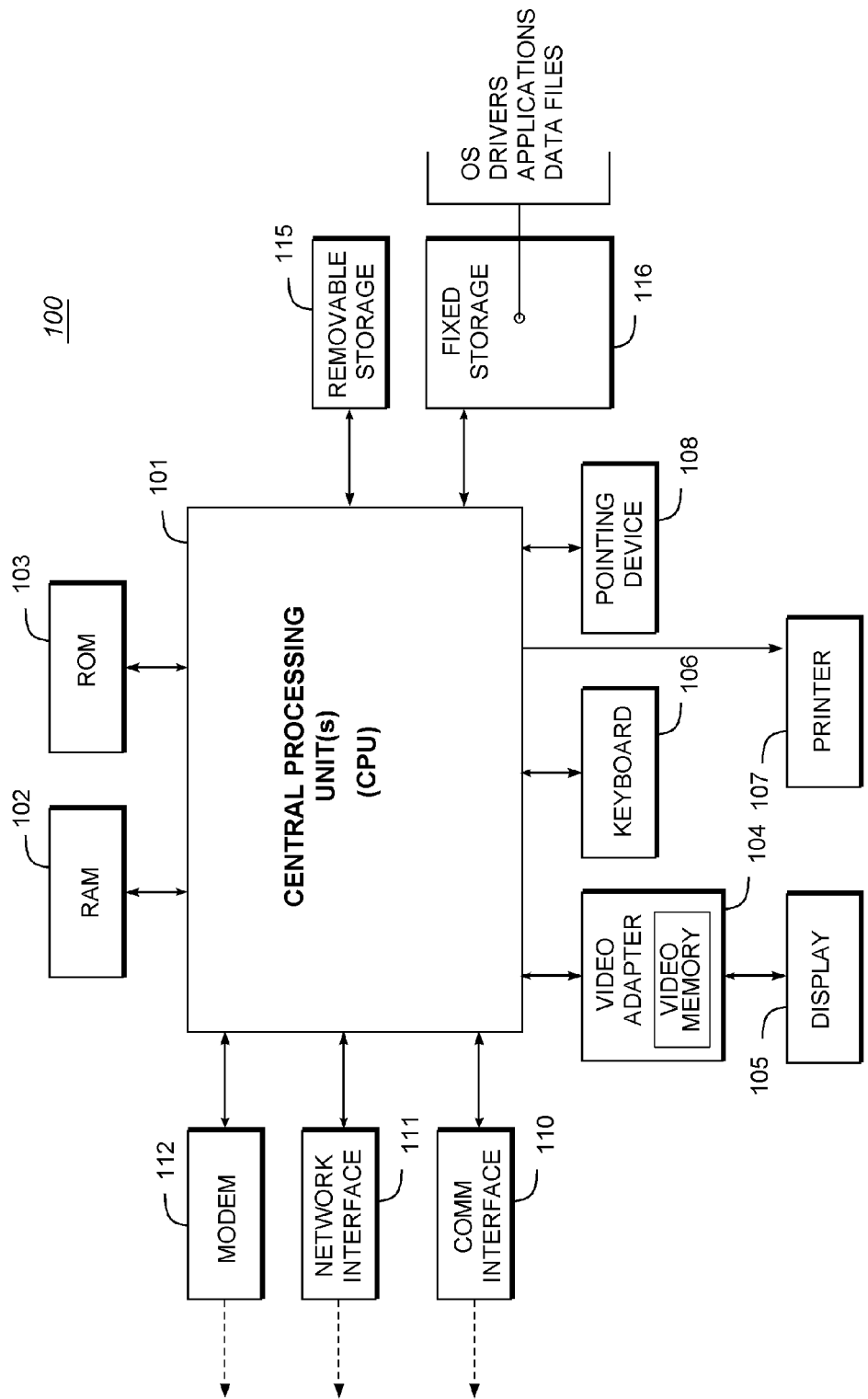
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

HTML: HTML stands for HyperText Markup Language, the authoring language used to create documents on the World Wide Web. HTML defines the structure and layout of a Web document by using a variety of tags and attributes. For further description of HTML, see e.g., "HTML 4.01 Specification", a World Wide Web consortium recommendation dated Dec. 24, 1999, the disclosure of which is hereby incorporated by reference. A copy of this specification is available via the Internet (e.g., currently at www.w3.org/TR/REC-html40).

J2EE: "J2EE" is an abbreviation for Java 2 Platform Enterprise Edition, which is a platform-independent, Java-centric environment from Sun Microsystems for developing, building and deploying Web-based enterprise applications. The J2EE platform consists of a set of services, APIs, and protocols that provide functionality for developing multi-tiered, web-based applications. For further information on J2EE, see e.g., "Java 2 Platform, Enterprise Edition Specification, version 1.4", from Sun Microsystems, Inc., the disclosure of which is hereby incorporated by reference. A copy of this specification is available via the Internet (e.g., currently at java.sun.com/j2ee/j2ee-1_4-fr-spec.pdf).

Java: Java is a general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.2," from Sun Microsystems, the disclosure of which is hereby incorporated by reference. A copy of this documentation is available via the Internet (e.g., currently at java.sun.com/j2se/1.4.2/docs/index.html).

JSP: JavaServer Pages (JSP) is a web-scripting technology similar to Netscape server-side JavaScript (SSJS) or Microsoft Active Server Pages (ASP). JSP is a presentation layer technology that sits on top of a Java servlets model and makes working with HTML easier. It allows a developer to mix static HTML content with server-side scripting to produce dynamic output. By default, JSP uses Java as its scripting language; however, the specification allows other languages to be used, just as ASP can use other languages (such as JavaScript and VBScript). For further description of JavaServer Pages, see e.g., "JSR-000152 JavaServer Pages .0 Specification", available from Sun Microsystems. A copy of this specification is available via the Internet (e.g., currently at jcp.org/aboutjava/communityprocess/final/jsr152/).

JDBC: JDBC is an application-programming interface (API) that provides database access from the Java programming language. JDBC allows Java applications to access multiple database management systems. A set of interfaces is included in the standard JDBC API for opening connections to databases, executing SQL commands, and processing results. Each relational database management system usually requires a driver to implement these interfaces. A JDBC driver manager typically handles multiple drivers that connect to different databases. Accordingly, JDBC calls are generally sent to the JDBC driver manager, which passes the call to the driver for interacting with the specified database. For further information on JDBC, see e.g., "JDBC 3.0 API Documentation", from Sun Microsystems, the disclosure of which is hereby incorporated by reference. A copy of this documentation is available via the Internet (e.g., currently at java.sun.com/products/jdbc/download.html#corespec30).

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999.

Thread: A thread refers to a single sequential flow of control within a program. Operating systems that support multi-threading enable programmers to design programs whose threaded parts can execute concurrently. In some systems, there is a one-to-one relationship between the task and the program, but a multi-threaded system allows a program to be divided into multiple tasks. Multi-threaded programs may have several threads running through different code paths simultaneously.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations. For further description of XML, see e.g., "Extensible Markup Language (XML) 1.0", (2nd Edition, Oct. 6, 2000) a recommended specification from the W3C, the disclosure of which is hereby incorporated by reference. A copy of this specification is available via the Internet (e.g., currently at www.w3.org/TR/REC-xml).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
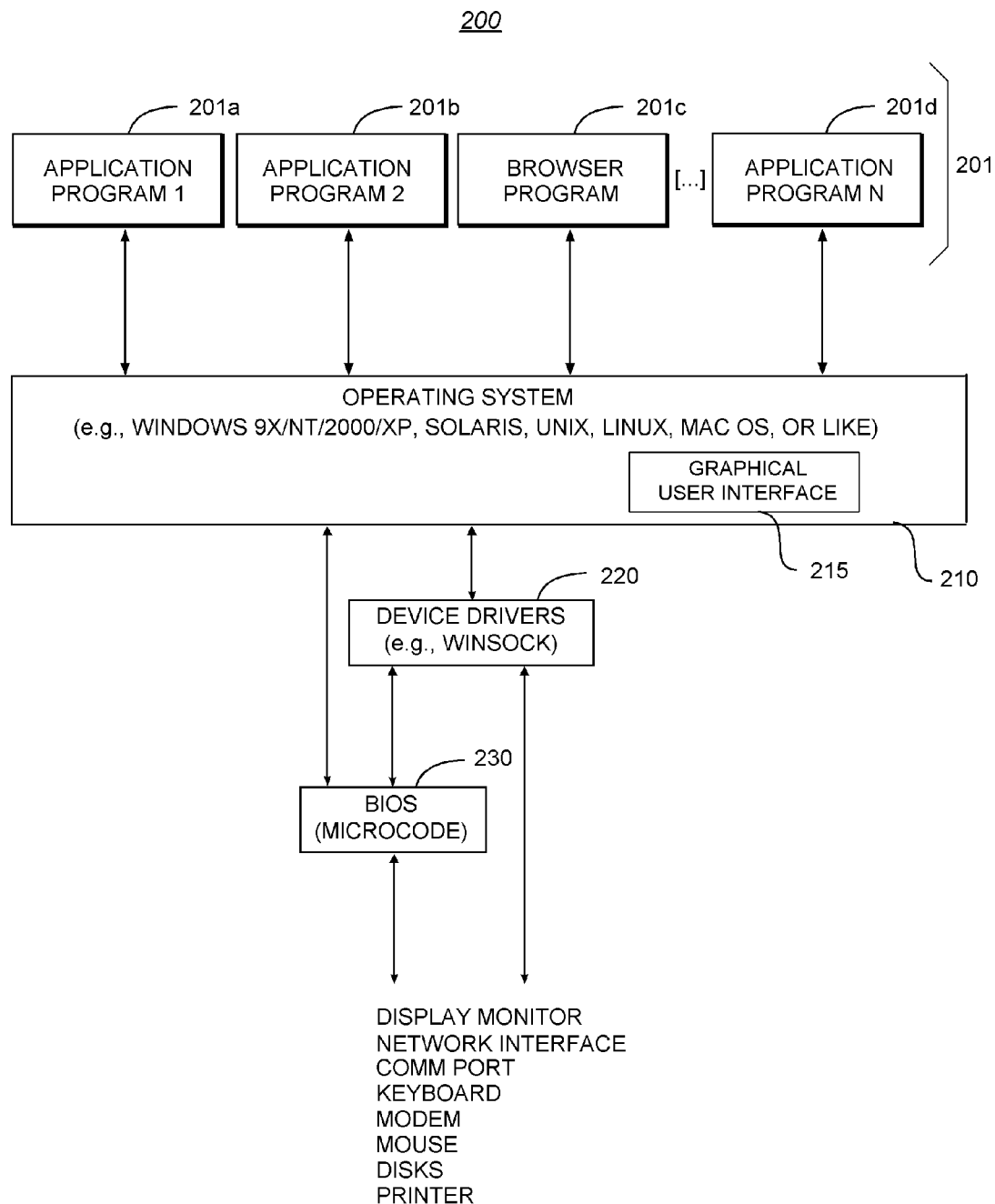
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernal or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Hierarchical Permission System with Limit Checks for Entitlements

The present invention comprises a hierarchical permission system with methodology for multi-period cumulative limit checks for function-specific and object-specific entitlements. The system of the present invention allows an organization (such as a financial institution, corporation or business) to define an entitlements hierarchy that applies permissions to defined roles. In one embodiment, this entitlements hierarchy provides for allowing or restricting access to specific functions of a financial application (e.g., a corporate banking application). Each of the roles that is defined in the hierarchy is defined as a set of entitlements, with inheritance.

The present invention provides a system that allows the restriction of transactional functionality for a business user, typically a bank customer, a bank employee and/or other financial services agent. The functionality itself may be categorized as application-specific entitlements, transaction entitlements, and limits or limit entitlements. Application-specific entitlements pertain to the issue of whether a given user is allowed to perform certain functions (e.g., create wire transactions). Application-specific entitlements are typically used to limit access to features of a user interface. Transaction (or operation) entitlements pertain to the issue of whether a given user is allowed to perform a certain transaction or operation on an object. Transaction entitlements are typically used to limit access to specific functions in a product. Limit entitlements pertain to whether a given user is allowed to perform any of the foregoing (i.e., application-specific entitlements or transaction entitlements) up to a certain limit. Limit entitlements are typically used to set a maximum amount, such as setting a dollar limit for payment operations and other banking functions.

The hierarchical nature of the system is not unlike other hierarchical-based role systems, where a given a role may be defined to have certain functions. A given role may, in turn, have subroles that inherit attributes of the parent (i.e., superior role). This approach may be used to establish a hierarchy of roles, where roles are inherited from above. In accordance with the present invention, however, the inheritance is negative (i.e., restrictive). A root node ("root") resides at the top of the inheritance hierarchy and is predefined to be enabled for everything (e.g., all functions). The "root" serves as an administrator or superuser who may perform all functions in the system. As the hierarchy is traversed, additional restrictions are applied (i.e., restrictions to functions at any given point in time). Using this approach, for example, a business owner can define what subroles exists in a business. For each role, certain functions would be enabled or restricted. For each function that is enabled, the function is usually associated with a limit and a period, thereby providing a maximum amount or volume per period as well as a fixed amount per transaction type. In this manner, individual business users may be easily added to the hierarchy and enabled to perform operations up to a certain limit.

An important aspect of the entitlements system and methodology of the present invention is the ability to define limits which can be applied to individual users (group members) and/or groups. The entitlements system determines all limits and tracks running totals of activities per user and/or per group (a group may, for example, be a business, division, or other group). A particular user may be affected by any limits that have been specifically defined as applying to him or her as well as limits defined for the group that he or she belongs to, one or more parents of the group that he or she belongs to, and/or any limits set for the business. These limits can, for example, be set for ACH (approval, activation, and maintenance), bill pay, account transfers, wire transfers, and the like. Limits may be set so that the user cannot exceed the limit (the transaction is rejected and the user will receive an error message), or transactions can be handled using an approval workflow supported by an approval system (e.g., transactions in excess of limit require approval from another user or administrator).

The system and methodology of the present invention allows an organization to define limits that are not only cumulative to a specific role but that also roll up through the entire role hierarchy. A business may, for example, specify that (1) its accounts receivable function is able to perform wire transactions, subject to limits of $1,000 per wire, $1,000 per day, and $20,000 per month, (2) its accounts payable function has the same limit, but (3) the controller function has a different set of limits. Suppose that, for this particular business, the accounts receivable, accounts payable, and controller function roll up to the CFO (chief financial officer) function in the organization's hierarchy, and the CFO role itself has a specified limit of $50,000 per day and $100,000 per month. In this circumstance, the present invention enables the organization to define and enforce limitations that the combination of functions under the CFO cannot collectively spend more than the limit specified for the CFO.

Additionally, the system supports future payments. For example, a user may schedule a payment for Monday two weeks hence. In addition to capturing information about the role that the user belongs to, the system will limit check the action with the amount on the effective date, not on the submission date. This allows the system to control user actions to ensure that limit checks will not be exceeded at a future date.

The present invention provides a flexible solution to define a hierarchy of roles and to establish and enforce entitlements of these roles to perform a wide range of activities. The solution allows businesses to establish and enforce limits among multiple dimensions, thereby allowing constraint processing in a manner that achieves the business goals desired. Dimensions may be processed in different combinations along the lines of users and their groups, along the lines of hierarchical groups, along the lines of time periods, and along the lines of objects and functions (including monetary limits).

The solution is particularly useful in conjunction with common banking or financial services applications. The individual banking or financial services applications may each perform its own specialized functions, but collectively they may share the same business functions—that is, across different types of applications in a financial service environment (e.g., banking, brokerage, insurance, or payment environment). Consider, for example, a firm that provides both banking and insurance services. That firm may, as a business rule, desire to share a single instance of a role hierarchy (and its multiple functions) across its entire organization, that is, across its business functions.

The present invention also provides a self-contained solution that is not inherently part of any given financial services application. Instead, it is separately broken out, thus giving it the flexibility to be deployed with different types of applications. It is particularly well-suited for use with any application that needs to deal with the above-described processing and transaction functions. The system of the present invention is pre-populated with a set of default rules for a common set of business functions, limits, and transaction types. However, the rules are fully user extensible. Here, a user may add arbitrary object types, transaction types, limit types, period types, and the like. This provides an easy mechanism to extend the infrastructure in a manner that best suits a particular organization's own needs.

The system also facilitates customization of the solution to suit an organization's needs by providing certain roles that are allowed to perform operations on other roles. Consider the roles of a business, which includes a business owner. The business owner may determine that particular individuals are allowed to make certain modifications to that business in terms of entitlements and may define administrator roles for these individuals. The individuals may then administer the permissions (entitlements) of certain target groups.

In the context of a banking application, it may be the case that only certain bank employees (e.g., customer service representatives or CSRs) are allowed to make certain modifications to the permissions (entitlements) provided to certain customer groups to perform banking transactions. For example, a bank's CSR entitlements group may be allowed to authorize certain changes to the entitlements of a customer business group (e.g., to increase transaction limits). A business owner cannot give himself or herself a higher limit for performing banking transactions on a given day, but a business owner may essentially assign roles to a business and then perform entitlements within the limits and ranges that the bank has established. Therefore, in the context of the bank application, the increased limits would have to be approved by an appropriate bank employee (e.g., CSR) or officer. If a business requires changes in its daily, weekly, or monthly limits, then those can only be modified by some other entitlements group that has "administration" privilege over the particular business. The components of the system will next be described.

System Components

Components of Currently Preferred Embodiment

In one embodiment, the present invention is commercially embodied as a component of a Financial Fusion (trademark) Corporate Banking Solution application. Although the following discussion describes utilization of the present invention as a component of this Corporate Banking Solution product, the present invention is not limited to use in this context and may be used in a wide range of other applications. For example, the system and methodology of the present invention may also be used in conjunction with consumer banking applications, brokerage and trading applications, and a number of other financial and business applications.

The Financial Fusion Corporate Banking Solution, which is based on Java 2 Enterprise Edition (J2EE) components, allows users to manage a wide variety of banking services from a single Web portal providing connectivity to a number of back-end systems. The solution uses JavaServer Pages (JSPs) to provide information to customers in a Web portal and includes back-end system connectivity tools facilitating customization of the solution to address specific customer requirements. The Corporate Banking Solution design is modular; it is based on a series of application components that are integrated and yet can be customized to address particular customer requirements. It includes a framework that supports middleware services and provides tools to enhance and support customization and back-end integration. The solution includes three tiers: a Web tier; an application tier; and a back-end tier. These tiers work together to create the user interface (UI) and business logic solutions that make up the Corporate Banking Solution. Each of these tiers will be briefly described.

The Web tier includes static and dynamic presentation layers which work together to create a dynamic Web user interface. To develop a specific user interface (UI), a Web designer creates the HTML content and images for the JSP pages, and a Web developer would create supporting JSP tag libraries and beans. All of these elements reside on the Web tier. The static presentation layer typically consists of static HTML files and images that reside on a Web server. When a user accesses the portal (i.e., Web server), this layer provides any static information to the user interface. If the user requests information from a back-office database or makes some other interactive request, these actions are redirected to JSPs in the dynamic presentation layer on the Corporate Banking Solution application server. The dynamic presentation layer consists of the JSPs, tag libraries, XML files, services, tasks, and Java Beans that provide dynamic content delivery over the Web. JSPs are redirected and processed by the application server. HTML is issued from the JSP layer and displayed through a Web browser.

The application tier implements the business logic to complete requests made by the user using the Web tier (i.e., user interface). The application tier includes an end user (corporate banking) module (e.g., for use by bank customers) and a customer service representative (business central) module (e.g., for use by bank employees) as well as a core API for receiving requests from the user interface (UI), forwarding them to the back-end systems, and returning responses from the back-end systems to the UI. The following discussion will focus on those modules of the Corporate Banking Solution which implement the system and methodology of the present invention.

Figure 3:
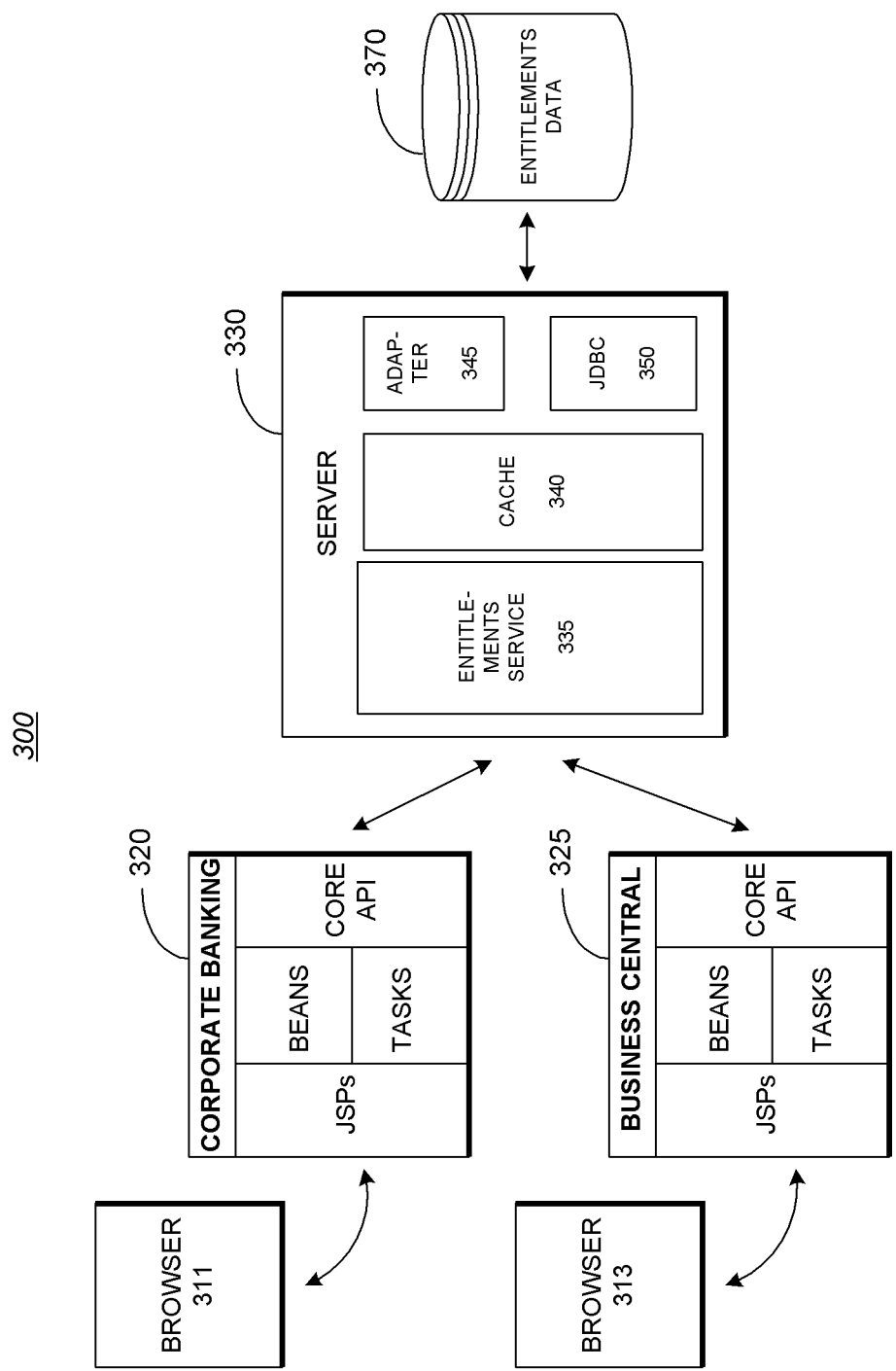
FIG. 3 is a block diagram of an environment in which the system of the present invention may be preferably embodied.

FIG. 3 is a block diagram of an environment 300 in which the system of the present invention may be preferably embodied. As shown, the browsers 311, 313 represent clients connected to the corporate banking module 320 and business central module 325, respectively. The corporate banking module 320 provides the JSPs, tasks, and beans that make up the core of the Corporate Banking Solution. Modules provided by the Corporate Banking Solution include administration, account management, cash management, positive pay, controlled disbursements, lockbox, payments and transfers, domestic and international wire transfers, ACH and tax payments, reporting, alerts, messages, and check imaging. The Corporate Banking Solution includes a CSR (Customer Service Representative) module shown in FIG. 3 as the Business Central module which allows bank employees to manage usage and access of the Corporate Banking Solution.

Supporting applications and services are provided through the Financial Fusion (trademark) Server (or simply "server") 330. Of particular interest, the services provided through the server 330 include an entitlements service 335 which implements core methodology of the present invention. The entitlements service module 335 is an execution engine that includes the core logic of the present invention and interacts with other components. The entitlement services 335 and the server 330 may support (i.e., provide services to) multiple applications. It should be noted that although the server 330 is shown separately from the corporate banking module 320 and business central module 325 at FIG. 3, these modules could, in fact, be installed and implemented on one machine or a plurality of machines, as desired.

In addition to the entitlements service 335, the server 330 also includes a cache 340, an adapter 345, and a JDBC driver 350 for connecting to a back-end entitlements database 370. The cache 340 provides for retaining certain entitlement information locally at the server 330 to avoid having to repeatedly read and update entitlement information in the database 370. This caching feature is described below in more detail. The adapter 345 and JDBC driver 350 provide for connectivity to the entitlements database 370. The entitlements database 370 comprises a conventional database (e.g., as supplied by Sybase, Inc. of Dublin, Calif., Oracle Corporation of Redwood Shores, Calif., or IBM Corporation of Armonk, N.Y.) for storing entitlements information. The entitlements database 370 includes a persistent database schema for representation of a hierarchical permission structure.

Database Schema for Representation of Hierarchical Roles

The present invention supports a role-based authorization model. A role specifies a group of entitlements. Entitlement groups represent roles and may be layered hierarchically. An entitlement entry restricts a user from performing a business operation (e.g., wire transfer) on a specific set of business objects (e.g., one or more accounts). For example, an entitlement defined for a particular user may restrict the user from performing wire transfers on a set of accounts. Currently, a customer, business, and bank employee may be part of at most one entitlement group, to deal with idiosyncrasies related to managing and maintaining limits.

As shown above, users are associated with entitlement groups ("entitlement_group") within the entitlements system. An "entitlement_group" is identified by its primary key "ent_group_id". In order to support service bureau deployment, a group may also be associated with a "svc_bureau_id" (given that a group may be associated with a set of properties, this may also be modeled as a property), which allows the invention to be employed in an ASP (Application Service Provider) setting.

An "entitlement_group" table establishes the hierarchy for all the groups. It should be noted that for any entitlement group ("ent_group_id"), there is only one parent. The system allows for the definition of multiple entitlement trees. Each tree has a single root. Entitlement permissions are modeled as operations on objects. Thus, when an entitlement is restricted, both an operation name and an object are specified. The object is identified by an "object_type" (e.g., accounts) and an "object_id" (e.g., account number). More importantly, an operation name and an object may be wild-carded. This means that permission can be removed for a certain operation (e.g., wire transfer) across all objects. It also means permission can be restricted to operate on an object, regardless of the operation.

The root of each tree is implicitly associated with all operations (e.g., wire transfer, ACH, and so forth) available to the system. In addition, any particular node of the tree may be associated with a set of objects that are available to the group and its descendants (e.g., the list of accounts that is available to a business). Each descendant in the tree inherits these entitlements from its parent. The privileges of a descendant group are constrained by restricting entitlements from the descendant group. There will typically be multiple entries in the "entitlement_del" table for a particular group, one for each entitlement that is restricted for the group.

An "entitlement_admin" attribute lists all target entitlement groups on which a particular group can perform admin operations (i.e., on which the particular group has "admin" and/or "extend" privileges). By default, the group that creates another group gets "admin" privilege on the newly added group. "Admin" (administrative) privilege over a group allows the administrator (i.e., group with admin privileges) to modify attributes and/or delete the group over which it has admin privilege. Similarly, an "extent" privilege allows extending (i.e., adding descendants) to a group.

Importantly, the system of the present invention also provides a very flexible mechanism for defining limits. Limits may be defined relative to entitlement functions, objects, and/or a combination of the two. The entitlements database may include a row for each limit, which means there will often be multiple rows for each entitlements group. In the currently preferred embodiment, the limit is associated with the "entitlement_group" by "ent_group_id" (i.e., foreign key). The limit's primary key is "limit_id".

All entitlement entries will enumerate restricted entitlements only. Having a complete list of entitlements at each level would make the hierarchy much less efficient—changing a parent group entitlement, or choosing a different parent group would not automatically reflect changes down the entitlement tree. In an alternative embodiment, a user may be associated with more than one entitlements group. The concept of an entitlement user allows users to be associated with one or more entitlements groups. "Ent_group_type" can be used by the application to identify that a node in the Entitlements tree is of a certain, application specific type.

Basic Structure and Administration of the Entitlements Hierarchy

Figure 4:
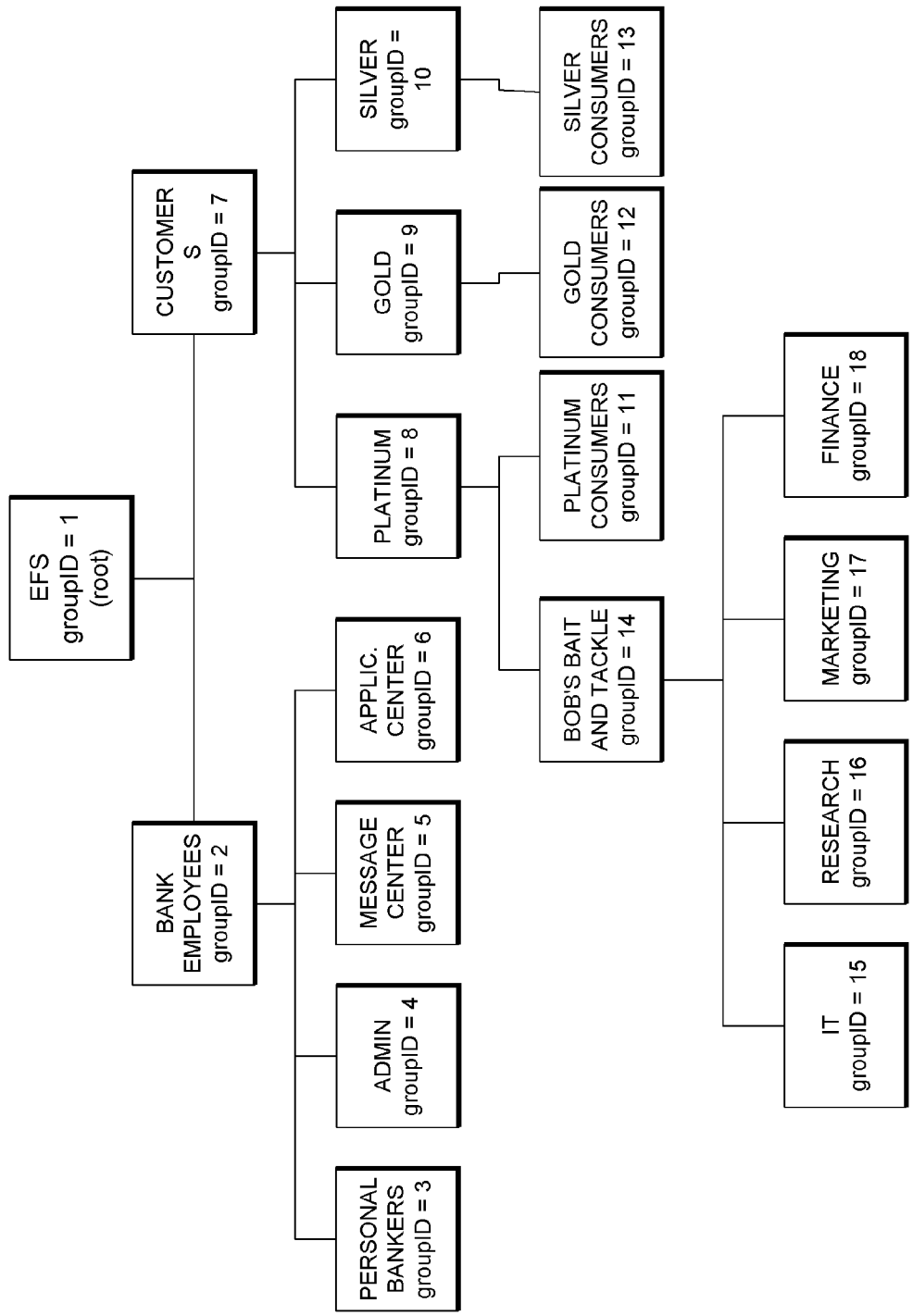
FIG. 4 illustrates an example of an entitlements hierarchy for one embodiment of the present invention.

FIG. 4 illustrates an example of an entitlements hierarchy 400 for one embodiment of the present invention. This example is a small sample of the total set of entitlements and users that a business may define using the system and methodology of the present invention. As shown, each group (represented as a box in the tree) is identified by its "grouped". Each group consists of entitlements that are restricted at that level, and possibly limits that will be applied. Note that the group as it is implemented in the database does not actually contain users, but the users refer to the group. All of the limits and restricted entitlements are inherited from groups above (i.e., the parent of the group, its parent, and so forth). For example, groupId 15 (i.e., IT for "Bob's Bait and Tackle"), inherits entitlements and limits from groups 14, 8, 7, and 1. Additional restrictions may then be applied to this group (IT for "Bob's Bait and Tackle") so as to restrict certain entitlements inherited from the parent groups.

The sample entitlements hierarchy illustrated at FIG. 4 models a simple banking hierarchy as follows. EFS with groupID=1 has all permissions and is considered to be the root node. There are two children of the root node: Bank employees, with groupID=2; and Customers with groupID=7. The Bank employees' node (groupID=2) may, for instance, have all of the same permissions of the root node.

The Customers node (groupID=7) also inherits from the root node, but may have restrictions applied in order to reserve certain administrative activities to Bank employees. For example, employees of the given bank or financial institution may be given permission to perform different operations. They may create market segments, service packages, and different types of business users and marketing managers, and entitle them to perform different functions.

As shown at FIG. 4, the Bank employees are divided into four categories or groups: personal bankers, admin, message center, and application center, with groupIDs 3-6, respectively. Each of these groups is represented as a child node of the Bank employees group. At the same level Customers are divided into one of three market segments (each of which may have an associated banking service package): Platinum, Gold, and Silver, with groupIDs 8, 9, and 10, respectively. Each market segment can then be further divided. Each of these market segments may, for example, be divided into consumer and business groups. As shown, the Platinum group (groupID=8) has as its children a Platinum consumers group (groupID=11) and a "Bob's Bait and Tackle" business (groupID=14). A business can also be divided into various entitlement groups. As shown at FIG. 4, Bob's Bait and Tackle has the following four children: IT (groupID—15), Research (groupID=16), Marketing (groupID=17), and Finance (groupID=18). Different entitlements may be defined for each of these entitlement groups. Generally, entitlements are further restricted as one goes further down the tree structure (e.g., by taking away entitlements, reducing limits, and so forth).

Each entitlement group will generally have associated with it a list of groups that can administer the entitlement group. For instance, assume that the admin group (groupID=4) can administer the Platinum and Gold Customer groups (groupID=8 and groupID=9). This means that any member of the admin group can administer the entitlements hierarchy for these target groups. In administering the entitlements hierarchy, by default the creator of a group may administer the group (i.e., has admin privilege) and may add descendants to the group (i.e., extend privilege). Additionally, entitlement groups (not specific users) have administrative rights over other entitlement groups. Administrative privilege over an entitlement group allows the administrator to modify group attributes and grant and revoke permissions, including administrative (admin) privileges. Also, it should be noted that administrative privilege over a parent of a given group does not automatically imply an administrative privilege over the given group or its descendants. The process for defining a hierarchical permission structure and associating multi-period limit checks for function-specific and object-specific entitlements will next be described in more detail.

Detailed Operation

Defining Entitlement Groups and Evaluating Entitlements and Limits

Figure 5A:
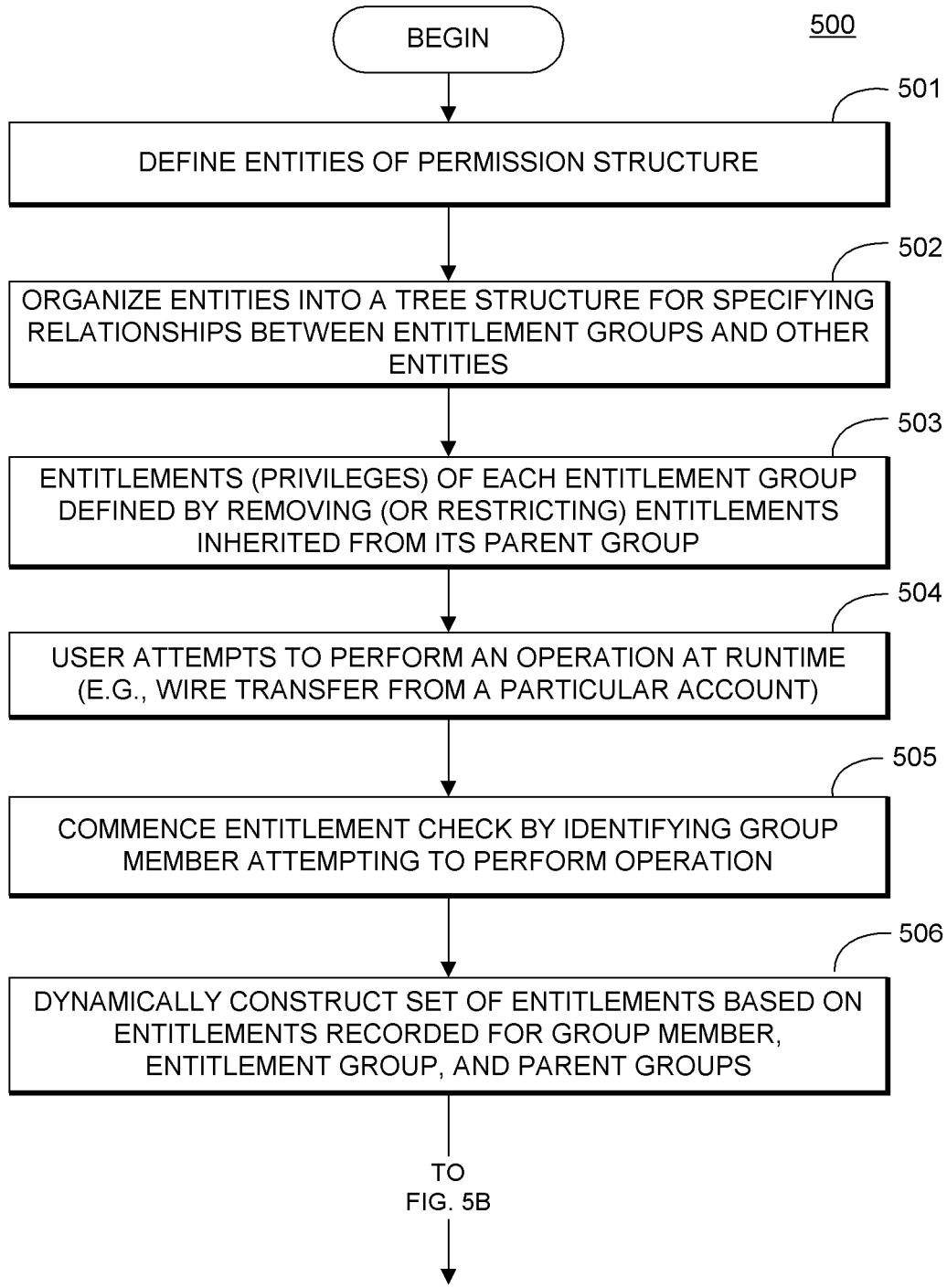
FIGS. 5A-B comprise a single flowchart illustrating at a high level the methodology of the present invention for defining a hierarchical permission structure and applying entitlements and limits defined by the structure in determining whether to authorize certain activities.
Figure 5B:
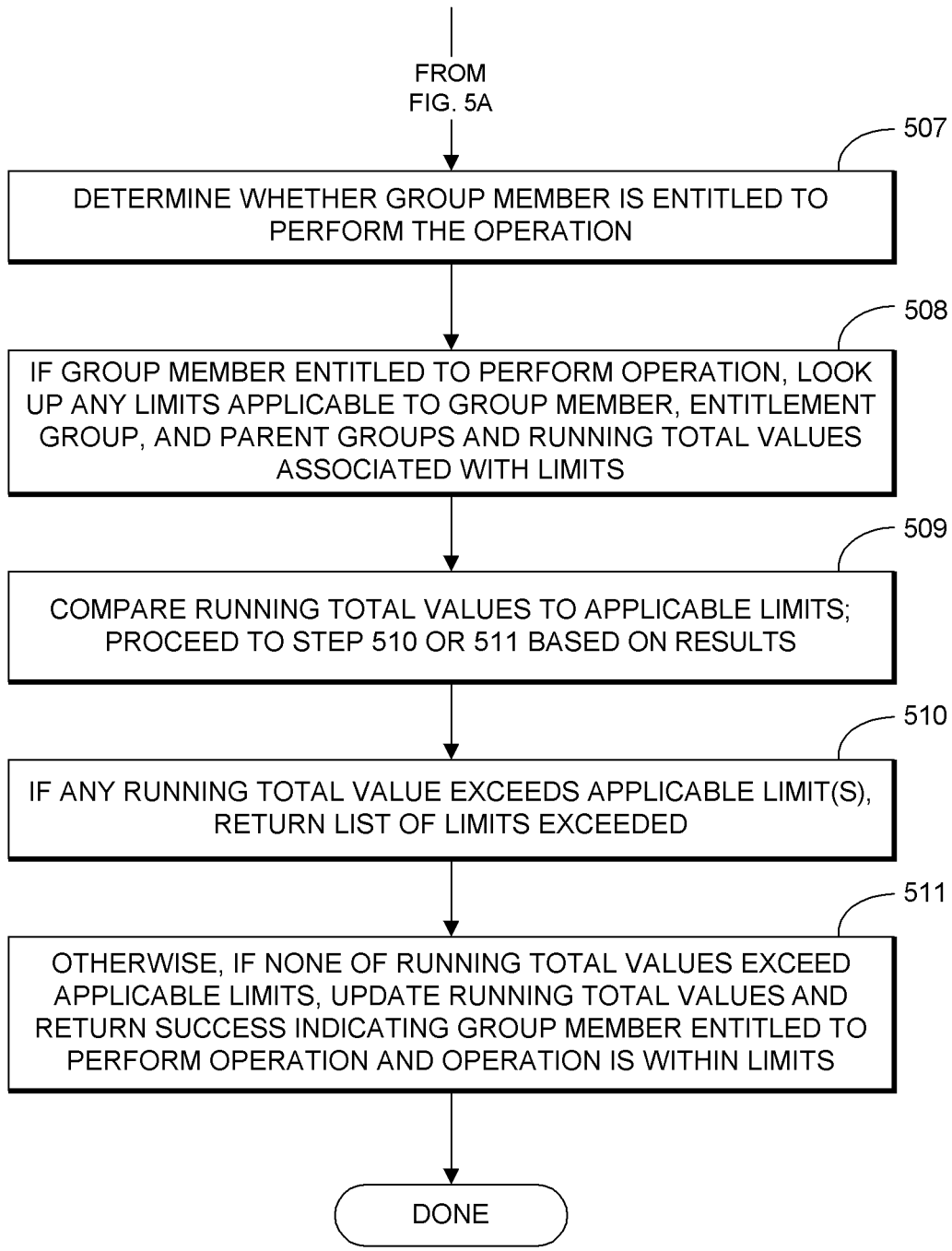

FIGS. 5A-B comprise a single flowchart 500 illustrating at a high level the methodology of the present invention for defining a hierarchical permission structure and applying entitlements and limits defined by the structure in determining whether to authorize certain activities. The following discussion uses an example in which the system and methodology of the present invention is used in conjunction with a banking application. However, this is only one example of its application and the present invention may also be used in a wide range of other financial and business applications. The following description presents method steps that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

The first phase of operations provides an organization (e.g., a bank, financial institution, or business) using the system to specify a hierarchical permission structure that is to govern various operations that are to be performed. This involves several steps. At step 501, entities of the hierarchical permission structure are defined. The system of the present invention enables the hierarchical permission structure to be defined with the following entities: entitlement groups, group members, admin groups, entitlement functions, entitlement periods, limit values, and object types. As described above, entitlement groups represent roles (sets of entitlements) and are hierarchically structured. Group members are specific users who belong to an entitlements group. Each entitlement group also has at least one admin group. An admin group is an entitlement group that has the right to modify the definitions of a target group (or set of target groups). The admin group is said to have "admin" (i.e., administrative) privilege over the target group(s). In addition, each group also has at least one extend group. An extend group is an entitlement group that may add child groups to the target group. The extend group is said to have extend privilege over the target group. In addition, arbitrary attributes may be defined and associated with every group. For example, an arbitrary attribute may be a geographic location of a particular group.

Next, at step 502, the entitlement groups and other entities are organized into a tree hierarchy for specifying the relationship of entities and the permissions (or entitlements) of each entitlement group to perform various operations. Generally, the root node (root entitlement group in the tree structure) is allowed to perform all functions (or operations) that are available in the system. In other words, all functions or operations that one wishes to entitle users to perform should be available to the root node given that other groups inherit from the root. Each group in the tree may be defined to have any number of children. By default, each child group inherits all the functions available to its parent. In other words, each child in the tree inherits the entitlements from its parent. Furthermore, all objects (e.g., accounts) available to the parent are also accessible by the child. At this step, group members (e.g., individual users or an entity such as a check printer) are also associated with a particular entitlements group. By default, this means that the group member's entitlements are the same as the group's entitlements. However, as described below, further restrictions may be applied to group members as well as groups. Each group may also be associated with one or more property lists. This allows the system to be extended.

At this point, the entities have been defined and the entitlement groups have been organized into a tree structure. At step 503, the privileges of each descendant group and/or group member are constrained by removing (or restricting) entitlements inherited by the descendant group from its parent (or by a member from a group). For each child group, any number of functions owned by the parent group may be restricted (or removed) and specific periodic (or per-transaction) limits may be associated with each of those functions. The same is true for specifying entitlements relating to objects. Various types of limits may also be specified for groups and group members. The limits that are defined may apply to an operation for which permissions can be granted or restricted such as, for example, creating wire transfers. The child group may, for example, have a lower limit for wire transfers (e.g., $1,000 compared to $10,000 for its parent). The limits may also be defined to apply with respect to objects that are acted upon by an operation such as, for example, a bank account. The system allows definition of both object types and entitlements. This allows the system to support transaction-based, object-based, and combined transaction-object-based limits. It should be noted that steps 501-503 above are not necessarily performed in the order described above. Those skilled in the art will appreciate that entities, relationships, limits, and other attributes and properties may be defined and specified in an iterative fashion. The hierarchical permission structure will also typically be adjusted and modified from time to time after it is initially implemented.

After the organization has specified a hierarchical permission structure that is to govern operations that are to be performed, at runtime the system of the present invention may also maintain and enforce the entitlements specified in this permission structure. This may include two additional phases of operation. The first involves performing an entitlements check and the second involves performing a limit check. An entitlements check and a limit check for determining whether to permit a given operation will now be described. At step 504, a group member (e.g., individual user) may attempt to perform an operation at runtime, such as requesting issuance of a wire transfer from a particular account. At step 505, the system commences an entitlements check by identifying the group member that is attempting to perform the operation.

Next, at step 506, the system dynamically constructs a set of entitlements for the group member (i.e., the user making the request in this example) based on looking up any entitlement restrictions recorded for the group member, the member's group (i.e., entitlement group) and any parent entitlement groups. As described below, a caching mechanism is employed for entitlement checking which enables the present invention to have both a low run-time cost for entitlement checking (a very common operation) and a low memory-footprint. After the entitlements have been dynamically constructed, a determination is made, at step 507, as to whether the group member (i.e., user) is entitled to perform the operation on this particular account object. Generally, if the operation is restricted at any level (i.e., at the member, group, or any parent), then the entitlement check fails. Otherwise, if the operation is not restricted at any level the group member is entitled to perform the operation.

If the group member (user) is entitled to the perform the operation, the system may then perform a limit check. The limit check process uses certain information already collected in the above steps, including the identification of the group member that is attempting to perform the operation. At step 508, the system then looks up any limits recorded for the group member, the member's entitlement group, and any parent groups. At this step the running total values associated with these limits are also retrieved (e.g., from cache). Running total values of financial transactions performed are maintained for purposes of determining compliance with limits (e.g., cumulative limits).

At step 509, the running total value associated with the limits are checked against the limits recorded for the member and the applicable entitlement groups. Based on the results of this step, the process proceeds to step 510 or 511. If any of the running total values exceed their defined limit values the system will, at step 510, return the list of limits that were exceeded. An application (or user) may then take action based on this information. This may include denying the operation or prompting a user (e.g., system administrator or bank employee) for determining whether or not the applicable limits may be exceeded in this particular instance. Otherwise, if none of the running total values exceed the defined limits, at step 511, the respective running total values affected by this operation will be updated and the system returns success indicating that the group member is entitled to perform the operation and the operation is within limits. The requested operation may then proceed.

Two caches are provided in the currently preferred embodiment in order to improve performance of the above operations. A first, lower-level cache includes raw data from the database in order to avoid repeatedly reading the same information. A second, higher-level cache maintains "cumulative" entitlement information. This information is the result of resolving all of the group member's permissions that were inherited at various levels of the entitlements hierarchy. The internal structures for caching entitlements information are described in more detail below.

Internal Structures for Caching Entitlements and Limits

In the currently preferred embodiment of the present invention entitlements are modeled as three-tuples which represent negative permissions (restricted entitlements). The format of the tuples is: (operation, obj_type, obj_id). Wildcarding is allowed in each of the positions resulting in the following possible combinations of entitlement information:

(1) (*, *, *)—all entitlements removed;
(2) (*, obj_type, *)—no operations allowed on the given obj_type;
(3) (*, obj_type, obj_id)—no operations allowed on the given obj_id;
(4) (operation, *, *)—the operation is disallowed on all objects;
(5) (operation, obj_type, *)—the operation is disallowed on the given obj_types; and
(6) (operation, obj_type, obj_id)—the operation is disallowed on the given obj_id.

(Note that an obj_id implies an obj_type. In other words, the presence of an obj_id implies that an obj_type exists.)

The caching mechanism of the present invention must have both a low run-time cost for entitlement checking (a very common operation) and as low a memory-footprint as possible (each user will cause the caching of multiple groups).

In certain special cases a user can take advantage of the enumerations that are known in advance and available for both "operation and obj_type", and build a two-stage data structure—one that could potentially answer "False" very quickly for a given (operation, obj_type) pair. If an immediate "False" cannot be returned, then a secondary data structure will be checked. It should be noted that tuple 1 (above) is equivalent to the two-tuple (*,*) as obj_id implies that an obj_type must exist. It can therefore be represented by a single Boolean value and does not need additional storage. It should also be noted that tuple 4 can be represented simply by a bit vector where one bit is allocated to each operation. Again, no additional data structure is needed because there can be no obj_ids specified in the tuple. Therefore, a very quick "False" result can be potentially generated by checking a Boolean and bit within a vector. Together, checking these two values will indicate whether further checking into a more complicated data structure is needed.

In most standard cases in the current invention, tuples of the form 2, 3, 5, and 6 (above) require extra checking as they can all legally contain an obj_id. The universe of legal obj_ids are not known in advance and therefore require a flexible data structure that, for a given (operation, obj_type) pair, contains an arbitrary number of obj_id. The secondary data structure currently consists of an array of HashMaps. Each entry in the array will hold a Hashmap containing the obj_ids for a specific operation and obj_type (with a single exception detailed below). In other words, the index into the array will be computed from operation X obj_type. Checks involving either tuples 2 or 3 will occupy the array indices "0 . . . n–1", indexed by obj_type. Checks involving tuples 5 and 6 will begin at "n" and go through to "n+n*m". For a given array entry, if no HashMap exists then the user is entitled. If a HashMap exists, then the presence of either a wildcard entry (for example, "*"), or obj_ids implies that the user is not entitled to the operation on the object_type and on the given obj_ids.

Data Structures

In the currently preferred embodiment of the system, the adapter level will cache the raw entitlement groups. At its topmost level, the cache needs to map entitlement group ids to data structures representing limits and entitlements. The top-level cache is therefore represented as a mapping from entitlement_id to GroupCache. The Group-Cache object contains: (1) EntitlementGroup; (2) Limits; (3) boolean allOff (represents tuple 1 (*,*,*)); (4) bitset op_restricted (represents tuple 4); (5) array of HashTable (represents tuples 2, 3, 5, and 6); and (6) Timestamp.

Pseudo-code for an entitlement check looks something like the following:

```
1: check_entitlement(operation, obj_type, obj_id)
2: // For convenience, assume operation and obj_type
3: // are mapped to integers
4: if ( allOff || op_restricted[operation] ) {
5:    return false;
6: } else {
7: //Start with tuples 2 and 3
8:    int index;
9:    if( operation.equals( "*") ) { // * represents wildcard
10:        index = obj_type;
11:    } else {
12: index = n + (obj_type * m) + operation
13: }
14:
15: Hashtable ht = array[index];
16:
17: // If there is no hashtable listing restrictions,
18: // then the operation is allowed
19: if (ht != null && (ht.get("*") != null || ht.get(obj_id) !=
null))
       return false;
20: }else
21:    return true;
22: }
23: }
```

The same GroupCache data structure is used to manage cumulative entitlements. Forming a cumulative group entry involves walking the group tree from the requested group to the root node and: (1) setting allOff to true if it is true anywhere; (2) logically OR'ing the op_restricted bit vector with that of parent groups; (3) creating the union of the hash tables at each array index; (4) computing the most restrictive limits from each group; and (5) recording the time the cumulative entitlement was computed.

The cache of raw entitlements and limits is currently held at the adapter level. Operations on entitlements, limits, and groups will maintain consistency with the cache and database, so that entries in the cache will always be valid. The timestamp field in the raw entitlement GroupCache object will always refer to the time of last access.

When requested from the adapter, the cumulative entitlements will always be valid, but subsequent changes made to any of the groups involved will invalidate the cumulative entitlements. Therefore, a cleanup process ("reaper thread")

is scheduled to run at fixed intervals; this thread will clean-up the cumulative entitlement groups that were generated greater than X milliseconds ago.

The raw (adapter-level) cache also periodically needs to be cleaned-up as otherwise it would continue to grow without bound. The GroupCache object maintains a timestamp that is updated with current system time upon each access and all groups that have not been accessed within a certain period of time are removed.

Common Terms Used in Entitlements System

The following lists some common terms which are used in the following discussion of the entitlements system and the meaning of such terms:

Entitlement Type: An operation for which permissions can be granted or restricted, for example, Tax Payments.

Limit Type: An operation that is permitted with specific constraints, for example, Wires Create (i.e., creating wire transfers).

Object Type: An item that is acted upon by an operation, for example, accounts or ACH companies.

Entitlement Group: A group that specifies a set of similar permissions. Entitlement groups represent roles (sets of entitlements) and are hierarchically structured. The system of the present invention allows for the definition of multiple entitlement trees. Each descendant in the tree inherits the entitlements from its parent. The privileges of a descendant group are constrained by removing (or restricting) entitlements of the parent from the descendant group.

Entitlement Group Member: A specific user who belongs to an entitlements group.

Limit: A specified numerical amount per transaction and/or over a period of time, which constrains the use of a particular operation. Limits are used to set a maximum amount for a user or group to transfer between accounts, to pay bills, and so forth. These limits can be set on a per-transaction basis or be tied to running totals, such that a business, group, or user may not exceed a limit over a specified period of time, such as daily, weekly, monthly, or quarterly. For example, a particular entitlements group may be subject to a limitation of up to $10,000 per month on wire transfers.

Restricted Entitlements: Entitlements for which specific users or groups do not have permission relative to the parent.

Cumulative Entitlements: List of entitlements for which a user or group does not have permission.

Restricted Limit: Limits for which specific users or groups do not have permission relative to the parent.

Cumulative Limits: List of limits for which users or groups do not have permission.

Entitlement Type Properties: Name and value pairs that provide extra information about an entitlement type, such as specifying where and when an entitlement type is displayed in the user interface. For example, an entitlement type with a property named "category" and an assigned value of "per group" may appear in the group administration pages.

Limit Type Properties: Name and value pairs that provide extra information about a limit type, such as specifying where and when a limit type is displayed in the user interface. For example, a limit type with a property named "category" and an assigned value of "per group" may appear in the group administration pages.

Extend: An action which creates sub-groups from parent groups.

Service Bureau ID: Identification number to allow for operations in a Service Bureau environment (e.g., support for multiple banks hosted in a single environment.)

Administrator: A user who has the ability to change company and user information in the entitlements system.

Entitlement Types

The following list identifies some of the available entitlement types. The entitlement types list is provided as a default list in the currently preferred embodiment of the present invention; a user can create a new list of entitlements or modify the default entitlement types list to suit their business needs:

The following are examples of entitlements for Bank employees that are provided by default in the currently preferred embodiment of the present invention:

Manage Consumer Banking—enables management of Consumer users;

Manage Corporate Banking—enables management of Corporate users;

BankEmployeeCreate—provides for adding a new bank employee;

BankEmployeeEdit—provides for modifying a bank employee;

BankEmployeeDelete—enables removal of a bank employee; and

BankEmployeeView—provides for viewing information about a bank employee.

Examples of entitlements that may be provided to Corporate users of a corporate banking application (e.g., the above-described Corporate Banking Solution) include the following:

Payments—provides access to Bill Payment functionality;

Tax Payments—enables one to get, add, and delete items from the list of Tax Forms and provides access to Tax Payment functionality;

Cash Management—provides access to the Cash Flow Summary information;

Positive Pay—provides access to Positive Pay functionality;

Cash Flow Reporting—provides access to Cash Management functionality;

Controlled Disbursements—provides access to the Controlled Disbursements functionality; and Lockbox—provides access to the Lockbox functionality.

Limit Types

Importantly, the hierarchical, role-based permission system also provides for defining and enforcing several types of limits. The following list identifies and describes some of the available limit types that are provided as a default list in the currently preferred embodiment of the solution:

ACHBatch—is a limit for ACH Batches;

Payments—is a limit for Bill Payments;

Tax Payments—is a limit for Tax Payments;

Transfers—is a limit for all transfers;

Transfers From—is a limit for transferring from an account;

Transfers To—is a limit for transferring to an account;

Wires Create—is a limit for creating wires; and

Wires Release—is a limit for releasing wires.

As indicated above, these limit types are provided as a default list and a user can create a new list of limit types and/or modify the default limit types list to suit their business needs. The limits may also be defined on a per-transaction basis and/or cumulative basis (e.g., over one or more time periods) and may be applied to individuals and groups in the hierarchy. These limits may also be defined to "roll up" the hierarchy, enabling not only specific limits to be applied to individuals or small groups, but also providing for more general limitations to be applied to larger segments of an organization.

Using the System to Define and Monitor Entitlements

The system of the present invention provides control and management of aspects of an entitlements hierarchy. A user can access the APIs and tasks directly, or use an entitlements manager component (tool) to manage the entitlements master list, perform initial configuration of the entitlements hierarchy, add custom entitlements and limits, troubleshoot any entitlement issues, and perform other actions.

The entitlements manager may be used to perform the following tasks: add and delete an entitlement type; add, modify, remove an entitlement type property; add and delete a limit type; add, modify, remove a limit type property; add and delete an object type; add, modify, delete an entitlement group; add, modify, delete an entitlement subgroup; add, modify, delete a restricted entitlement; add, modify, delete a limit; add, modify, delete a group member; and/or move a group member to a different group.

Generally, when entitlements are checked, they are first checked in memory (cache). If the specified entitlement is not found, the system checks the cache of the database instance.

Customizing Entitlements

A user can customize the system of present invention to suit their needs by adding custom entitlements and limits. The user can customize the system to control access to new features through entitlements and limits. The following list outlines the procedure to add new features and control access: (1) add new entitlement types and limit types using the entitlements manager; (2) adjust the menus to display or hide items based on the new entitlements; (3) adjust the templates to display or hide items based on the new entitlements; (4) insert new programming code into the user's service implementation to check the new entitlements and limits; and (5) restart the application server. If the user has changed the underlying programming code, the user may also need to recompile and re-deploy the application.

Submitting a Transaction into Approvals

In its currently preferred embodiment, the system of the present invention operates in conjunction with an approvals system (subsystem). If a transaction or operation exceeds one or more limits defined above, rather than simply denying the transaction or operation, the entitlements system may interact with the approvals system to determine if the transaction or operation should be allowed to proceed. For example, the system may specify whether or not particular limits may be exceeded with approval. In this event, when a limit check determines limits have been exceeded, a check is made to determine if all of the exceeded limits allow approval. If so, the transaction is then submitted to the approvals system for determining whether or not to approve the transaction.

Adding Entitlements and Limits for Specific Permissions

If the default entitlement types in the entitlements manager do not suit the needs of an organization, a user (e.g., administrator) may define more specific entitlement types. For example, the default entitlement type "Lockbox" is available in the entitlements manager and is used to control all Lockbox functionality. If an administrator wants to allow some users to see Lockbox Summaries, but not Lockbox Transactions, specific Lockbox entitlements may be defined such as Lockbox Summary and Lockbox Transaction. If an administrator wants to provide more specific entitlements, the following steps outlined below may be implemented: (1) adjust new entitlement types and limit types using the entitlements manager; (2) adjust the menus to display or hide items based on the new entitlements; (3) adjust the templates to display or hide items based on the new entitlements; (4) insert new programming code into the service implementation to check the new entitlements and limits; (5) restart the application server. If the underlying programming code was changed, it may also be necessary to recompile and re-deploy the application.

In one embodiment of the current invention the entitlement hierarchy may be administered by an administrator or other user using a graphical user interface (GUI). This GUI component may be used for management of the entitlements master list, initial configuration of the entitlements hierarchy, as well as troubleshooting of any entitlement issues. The GUI is capable of controlling and managing all aspects of the entitlements hierarchy.

Application Programming Interface Calls

The following routines are provided in the currently preferred embodiment of the system to get and check entitlements:

Get the cumulative entitlements for the group specified: public static boolean checkEntitlement(EntitlementGroupMember member, Entitlement entitlement).

Get the cumulative entitlements for the group member specified: public static Entitlements getCumulativeEntitlements(EntitlementGroupMember member).

Checks if the user is entitled to the specified entitlement: public static boolean checkEntitlement(EntitlementGroupMember member, Entitlement entitlement).

The following routines are provided to manage groups:

Checks to see if an entitlement group already exists with the given name, group type, and service bureau id: public static boolean entitlementGroupExists(String groupName, String groupType, int svcBureauId).

Add a new entitlement group to the entitlement hierarchy: public static EntitlementGroup addEntitlementGroup (EntitlementGroupMember member, EntitlementGroup ent).

Delete an entitlement group (will delete the group and any groups below it in the hierarchy): public static void deleteEntitlementGroup(EntitlementGroupMember member, EntitlementGroup ent).

Modify the properties of an entitlement group (if the parentId is modified, this will have the effect of moving the group in the hierarchy): public static void modifyEntitlementGroup (EntitlementGroupMember member, EntitlementGroup ent).

Get an entitlement group by id: public static EntitlementGroup getEntitlementGroup(int groupId).

Get an entitlement group by name, group type, and service bureau id: public static EntitlementGroup getEntitlementGroupByNameAndSvcBureau(String name, String groupType, int svcBureau).

Get an entitlement group by type: public static EntitlementGroups getEntitlementGroupsByType(String groupType).

Get an entitlement groups by type and service bureau id: public static EntitlementGroups getEntitlementGroupsByTypeAndSvcBureauString groupType, int svcBureauId).

Get all the children of an entitlement group: public static EntitlementGroups getChildrenEntitlementGroups(int groupId).

Get all the children of an entitlement group that have a specific group type: public static EntitlementGroups getChildrenByGroupType(int groupId, String groupType).

Get all top level entitlement groups: public static EntitlementGroups getTopEntitlementGroups( ).

Get all top level entitlement groups for a specific service bureau id: public static EntitlementGroups getTopEntitlementGroupsBySvcBureau(int svcBureauId).

The following routines are available for managing group administrators:

Get the entitlement groups administered by a given group: public static EntitlementGroups getGroupsAdministeredBy (int groupId).

Get the entitlement groups that administer a given group: public static EntitlementGroups getAdministratorsFor(int groupId).

Adds a group as an administer of another group: public static void addAdministratorGroup(EntitlementGroupMember member, EntitlementAdmin admin).

Modify group administration information: public static void modifyAdministratorGroup(EntitlementGroupMember member, EntitlementAdmin adminToModify, EntitlementAdmin newAdminValues).

Deletes a group as an administrator for a specific group: public static void deleteAdministratorGroup(EntitlementGroupMember member, EntitlementAdmin admin).

Returns true if the group specified in the admin object can administer the target group specified in the admin object: public static boolean canAdminister(EntitlementAdmin admin).

Returns true if the group specified in the admin object can extend (create a child group) for the target group specified in the admin object: public static boolean canExtend(EntitlementAdmin admin).

Routines to manage entitlement types:

Get the master entitlements list: public static HashMap getEntitlementMap( ).

Checks to see if an entitlement type already exists with the given name: public static boolean entitlementTypeExists (String typeName).

Routines to manage the members of a group:

Get members of an entitlements group: public static EntitlementGroupMembers getMembers (int grouped).

Add member to an entitlements group: public static void addMember (EntitlementGroupMember member, EntitlementGroupMember memberToAdd).

Modify the entitlements group that a member belongs to: public static void modifyMember (EntitlementGroupMember member, EntitlementGroupMember memberToModify).

Retrieve information for a specific group member: Public static EntitlementGroupMember getMember(EntitlementGroupMember member).

Remove member from an entitlements group: public static void removeMember (EntitlementGroupMember member, EntitlementGroupMember memberToRemove).

Get the number of members of a group: public static int getNumMembers (int groupId).

Routines to manage entitlements:

Get the raw entitlements for a specific entitlement group: public static Entitlements getRestrictedEntitlements(EntitlementGroupMember member, int groupId).

Get the raw entitlements for a specific entitlement group member: public static Entitlements getRestrictedEntitlements(EntitlementGroupMember member, EntitlementGroupMember memberToList).

Set the list of restricted entitlements for a group: public static void setRestrictedEntitlements(EntitlementGroupMember member, int groupId, Entitlements restrictedEnts).

Set the list of restricted entitlements for a group member: public static void setRestrictedEntitlements(EntitlementGroupMember member, EntitlementGroupMember memberToRestrict, Entitlements restrictedEnts).

Add the list of restricted entitlements for a group: public static void addRestrictedEntitlements(EntitlementGroupMember member, int groupId, Entitlements restrictedEnts).

Add the list of restricted entitlements for a group member: public static void addRestrictedEntitlements(EntitlementGroupMember member, EntitlementGroupMember targetMember, Entitlements restrictedEnts).

Remove the list of restricted entitlements for a group: public static void removeRestrictedEntitlements(EntitlementGroupMember member, int groupId, Entitlements restrictedEnts).

Remove the list of restricted entitlements for a group member: public static void removeRestrictedEntitlements(EntitlementGroupMember member, EntitlementGroupMember targetGroup, Entitlements restrictedEnts).

Routines to manage limits:

Get the cumulative limits starting from a particular entitlement group: public static Limits getCumulativeLimits(int groupId).

Get the cumulative limits starting from a particular entitlement group member: public static Limits getcumulativeLimits(EntitlementGroupMember memberToGet).

Get the cumulative limits starting from a particular entitlement group using limit search criteria: public static Limits getCumulativeLimits(EntitlementGroupMember member, Limit search).

Get the cumulative limits starting from a particular entitlement group with specific limit search criteria: public static Limits getCumulativeLimits(EntitlementGroupMember member, int groupToGet, Limit search, HashMap extra).

Get the cumulative limits starting from a particular entitlement group member with specific limit search criteria: public static Limits getCumulativeLimits(EntitlementGroupMember member, EntitlementGroupMember memberToGet, Limit search, HashMap extra).

Get the limits for a particular entitlement group: public static Limits getGroupLimits(int groupId).

Get the limits for a particular entitlement group member: public static Limits getGroupLimits(EntitlementGroupMember memberToGet).

Get the limits for a particular entitlement group using limit search criteria: public static Limits getGroupLimits(EntitlementGroupMember member, int groupId, Limit search, HashMap extra).

Get the limits for a particular entitlement group member using limit search criteria: public static Limits getGroupLimits(EntitlementGroupMember member, EntitlementGroupMember memberToGet, Limit search, HashMap extra).

Add a new limit to an entitlement group: public static void addGroupLimit(EntitlementGroupMember member, Limit limit).

Delete a limit from an entitlement group: public static void deleteGroupLimit(EntitlementGroupMember member, Limit limit).

Modify an existing limit in an entitlement group (period, name, data): public static void modifyGroupLimit(EntitlementGroupMember member, Limit limit).

Checks to see if a limit already exists with the given name, group, and period: public static boolean limitExists(Limit I).

Routines to manage running totals:

Check/update limits/running totals for a new limitable transaction (limits that have been exceeded are returned): public static Limits checkLimitsAdd(EntitlementGroupMember member, Entitlement ent, float amount, java.util.Date transactionDate) throws Exception.

Check/update limits/running totals for an edited limitable transaction (limits that have been exceeded are returned): public static Limits checkLimitsEdit(EntitlementGroupMember member, Entitlement ent, float oldAmount, float newAmount, java.util.Date oldDate, java.util.Date newDate) throws Exception.

Check/update limits/running totals for a deleted limitable transaction: public static void checkLimitsDelete(EntitlementGroupMember member, Entitlement ent, float amount, java.util.Date transactionDate) throws Exception.

Routines for entitlements reporting:

Retrieves report data from the audit log component: public static IReportResult getReportData(EntitlementGroupMember user, ReportCriteria criteria, HashMap extra) throws CSILException.

Determine if a specific object is being referred to explicitly in an entitlement or limit: public static boolean isObjectInUse (String objectType, String objectId) throws CSILException.

Routines for cleaning up:

Removes running total information for limits of a given period that are numDays old: public static void cleanup (int period, int numDays, HashMap extra).

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

The invention claimed is:

1. A method implemented in a computer system for specifying and enforcing entitlements for performance of financial transactions, the method comprising:
   in a computer system having at least a processor and memory, providing a hierarchical entitlement structure with inheritance for specifying entitlements for performing financial transactions;
   receiving user input for defining a plurality of entitlement groups of said hierarchical entitlement structure, wherein each entitlement group has specified permissions to perform financial transactions, limits on performance of said financial transactions, and membership of each user, said hierarchical entitlement structure proving that a given entitlement group inherits permissions provided to its parent entitlement groups in said hierarchical entitlement structure, and wherein defining a plurality of entitlement groups includes restricting permissions inherited by an entitlement group from its parent entitlement group in said hierarchical entitlement structure;
   in response to a particular user request to perform a financial transaction at runtime, identifying the particular user's membership in a certain entitlement group; and
   determining whether to allow the particular user to perform the financial transaction based on permissions and limits of said hierarchical entitlement structure applicable to the particular user's performance of the financial transaction.

2. The method of claim 1, wherein said step of defining a plurality of entitlement groups includes defining permissions to access particular objects in a financial application.

3. The method of claim 2, wherein said step of defining a plurality of entitlement groups includes defining permissions to perform functions on said particular objects.

4. The method of claim 2, wherein at least some of said particular objects represent bank accounts.

5. The method of claim 1, wherein said limits comprise limitations on values of financial transactions to be performed.

6. The method of claim 1, wherein said step of defining a plurality of entitlement groups includes defining limits comprising a selected one of per-transaction limits and cumulative limits over a period of time.

7. The method of claim 1, wherein said step of defining a plurality of entitlement groups includes defining permissions applying to a selected one of functions of a financial application and objects of a financial application.

8. The method of claim 1, wherein said step of defining a plurality of entitlement groups includes defining limits applicable to individual users.

9. The method of claim 1, wherein said step of defining a plurality of entitlement groups includes defining limits applicable collectively to members of an entitlement group.

10. The method of claim 1, wherein said step of defining a plurality of entitlement groups includes defining limits applying collectively to a particular entitlement group and children entitlement groups of said particular entitlement group in said hierarchical entitlement structure.

11. The method of claim 1, further comprising:
    tracking financial transactions performed for purposes of determining compliance with limits.

12. The method of claim 11, wherein said step of tracking financial transactions performed includes maintaining running total values of financial transactions performed in cache for improved performance.

13. The method of claim 12, wherein said step of determining whether to allow the particular user to perform the financial transaction includes determining whether any limits have been exceeded based on the running total values and the value of the financial transaction requested by the particular user.

14. The method of claim 1, further comprising:
    maintaining permission information for entitlement groups in the hierarchical entitlement structure in cache to improve system performance.

15. The method of claim 14, wherein said permission information is modeled as three-tuples representing negative permissions.

16. The method of claim 1, wherein permissions provided to an entitlement group include permissions to administer a certain other entitlement group.

17. The method of claim 16, wherein permissions to administer a particular entitlement group include modifying permissions of said certain other entitlement group.

18. The method of claim 16, wherein said permissions to administer a certain other entitlement group are subject to limitations defined for the entitlement group having said permissions to administer.

19. The method of claim 1, wherein permissions provided to an entitlement group include permissions to extend a certain other entitlement group.

20. The method of claim 19, wherein permissions to extend a certain other entitlement group include permissions to define a child entitlement group of said particular entitlement group.

21. A system for specifying and enforcing entitlements for performance of financial transactions, the system comprising:
    a computer having at least a processor and memory;
    a hierarchical entitlement structure with inheritance for specifying entitlements for performing financial transactions;
    a user input module for specifying a plurality of entitlement groups of said hierarchical entitlement structure, wherein each entitlement group has specified permissions to perform financial transactions, limits on performance of said financial transactions, and user membership, said hierarchical entitlement structure providing that a given entitlement group inherits permissions provided to its parent entitlement group in said hierarchical entitlement structure, and wherein said plurality of entitlement groups includes a child entitlement group inheriting permissions from its parent entitlement group in said hierarchical entitlement structure; wherein: restrictions are applied to the permissions inherited by such child inheritance and an enforcement module for determining, in response to a particular user's request to perform a given financial transaction at runtime, whether to allow the particular user to perform the financial transaction based on permissions and limits of said hierarchical entitlement structure applicable to the entitlement group of which the particular user is a member.

22. The system of claim 21, wherein said permissions to perform financial transactions include permissions to access particular objects in a financial application.

23. The system of claim 22, wherein said step wherein said permissions to perform financial transactions include permissions to perform functions on said particular objects.

24. The system of claim 22, wherein at least some of said particular objects represent bank accounts.

25. The system of claim 21, wherein said limits comprise limitations on values of financial transactions to be performed.

26. The system of claim 25, wherein limitations on values of financial transactions to be performed comprise a selected one of per-transaction limits and cumulative limits over a period of time.

27. The system of claim 21, wherein said permissions to perform financial transactions include permissions applying to a selected one of functions of a financial application and objects of a financial application.

28. The system of claim 21, wherein said specifying a plurality of entitlement groups includes specifying limits applicable to individual users.

29. The system of claim 21, wherein said specifying a plurality of entitlement groups includes specifying limits applicable collectively to members of an entitlement group.

30. The system of claim 21, wherein said specifying a plurality of entitlement groups includes specifying limits applying collectively to a particular entitlement group and children entitlement groups of said particular entitlement group in said hierarchical entitlement structure.

31. The system of claim 21, further comprising:
a module for tracking financial transactions performed for purposes of determining compliance with limits.

32. The system of claim 31, wherein said module for tracking financial transactions performed maintains running total values of financial transactions performed in cache memory of the computer.

33. The system of claim 32, wherein said enforcement module determines whether to allow the particular user to perform the financial transaction based, at least in part, on said running total values and the value of the financial transaction requested by the particular user.

34. The system of claim 21, further comprising:
a module for maintaining permission information for entitlement groups in the hierarchical entitlement structure in cache memory of the computer.

35. The system of claim 34, wherein said permission information is modeled as three-tuples representing negative permissions.

36. The system of claim 21, wherein permissions provided to an entitlement group include permissions to administer a certain other entitlement group.

37. The system of claim 36, wherein permissions to administer a particular entitlement group include modifying permissions of said certain other entitlement group.

38. The system of claim 36, wherein said permissions to administer a certain other entitlement group are subject to limitations defined for the entitlement group having said permissions to administer.

39. A method for defining and enforcing permissions and limits on performance of financial transactions in a banking system, the method comprising:
in a banking system implemented in a computer system having at least a processor and memory, receiving user input defining a plurality of entitlement groups, wherein each entitlement group has specified users, permissions to perform financial transactions and limits on performance said financial transactions;

organizing said plurality of entitlement groups into a hierarchical structure with inheritance specifying permissions and limits for performing financial transactions, said hierarchical entitlement structure providing that a given entitlement group inherits permissions provided to its parent entitlement group in said hierarchical entitlement structure, and wherein defining a plurality of entitlement groups includes restricting permissions inherited by an entitlement map from its parent entitlement group in said hierarchical entitlement structure;

in response to a particular user request to perform a financial transaction in the banking system at runtime, identifying the particular user's membership in a certain entitlement group; and determining whether to allow the particular user to perform the financial transaction based on permissions and limits of said hierarchical entitlement structure applicable to the particular user's performance of the financial transaction.

* * * * *